United States Patent
Kalkunte et al.

(10) Patent No.: US 8,027,341 B2
(45) Date of Patent: *Sep. 27, 2011

(54) SWITCH HAVING EXTERNAL ADDRESS RESOLUTION INTERFACE

(75) Inventors: Mohan Kalkunte, Sunnyvale, CA (US);
Shekhar Ambe, San Jose, CA (US);
Soma Pullela, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 921 days.

This patent is subject to a terminal disclaimer.

(21) Appl. No.: 11/490,181

(22) Filed: Jul. 21, 2006

(65) Prior Publication Data

US 2006/0256787 A1    Nov. 16, 2006

Related U.S. Application Data

(63) Continuation of application No. 09/885,929, filed on Jun. 22, 2001, now Pat. No. 7,126,947.

(60) Provisional application No. 60/213,478, filed on Jun. 23, 2000, provisional application No. 60/213,482, filed on Jun. 23, 2000.

(51) Int. Cl.
*H04L 12/56* (2006.01)
*H04J 3/24* (2006.01)

(52) U.S. Cl. ............... 370/392; 370/395.54; 370/474

(58) Field of Classification Search .................. None
See application file for complete search history.

(56) References Cited

U.S. PATENT DOCUMENTS

| | | | |
|---|---|---|---|
| 5,278,789 A | | 1/1994 | Inoue et al. |
| 5,329,527 A | * | 7/1994 | Ujihashi et al. ............... 370/397 |
| 5,390,173 A | | 2/1995 | Spinney et al. |
| 5,414,704 A | | 5/1995 | Spinney |
| 5,423,015 A | | 6/1995 | Chung |
| 5,459,717 A | | 10/1995 | Mullan et al. |
| 5,473,607 A | | 12/1995 | Hausman et al. |
| 5,499,295 A | | 3/1996 | Cooper |
| 5,524,254 A | | 6/1996 | Morgan et al. |
| 5,555,398 A | | 9/1996 | Raman |
| 5,568,477 A | | 10/1996 | Galand et al. |
| 5,579,301 A | | 11/1996 | Ganson et al. |
| 5,644,784 A | | 7/1997 | Peek |
| 5,652,579 A | | 7/1997 | Yamada et al. |
| 5,696,899 A | | 12/1997 | Kalwitz |
| 5,742,613 A | | 4/1998 | MacDonald |

(Continued)

FOREIGN PATENT DOCUMENTS

EP    0312917 A2    4/1989

(Continued)

OTHER PUBLICATIONS

"A High-Speed CMOS Circuit for 1.2-Gb/s 16×16 ATM Switching," Alain Chemarin et al. 8107 IEEE Journal of Solid-State Circuits 27 Jul. 1992, No. 7, New York, US, pp. 1116-1120.

(Continued)

*Primary Examiner* — Dang Ton
*Assistant Examiner* — Ryan Kavleski

(57) ABSTRACT

A network switch that has a plurality of input ports that receive data packets. An external interface is connected to the plurality of input ports. The external interface externally transmits the data packets for processing, and receives the data packets after processing. A memory management unit is connected to the external interface and a plurality of output ports are connected to the memory management unit.

13 Claims, 4 Drawing Sheets

U.S. PATENT DOCUMENTS

| | | | |
|---|---|---|---|
| 5,748,631 A | 5/1998 | Bergantino et al. | |
| 5,781,549 A | 7/1998 | Dai | |
| 5,787,084 A | 7/1998 | Hoang et al. | |
| 5,790,539 A | 8/1998 | Chao et al. | |
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,828,844 A * | 10/1998 | Civanlar et al. | 709/228 |
| 5,831,980 A | 11/1998 | Varma et al. | |
| 5,842,038 A | 11/1998 | Williams et al. | |
| 5,845,081 A | 12/1998 | Rangarajan et al. | |
| 5,872,783 A * | 2/1999 | Chin | 370/395.32 |
| 5,887,187 A | 3/1999 | Rostoker et al. | |
| 5,892,922 A | 4/1999 | Lorenz | |
| 5,898,687 A | 4/1999 | Harriman et al. | |
| 5,909,686 A | 6/1999 | Muller et al. | |
| 5,918,074 A | 6/1999 | Wright et al. | |
| 5,938,736 A * | 8/1999 | Muller et al. | 709/243 |
| 5,940,596 A | 8/1999 | Rajan et al. | |
| 5,987,507 A | 11/1999 | Creedon et al. | |
| 6,011,795 A | 1/2000 | Varghese et al. | |
| 6,041,053 A | 3/2000 | Douceur et al. | |
| 6,061,351 A | 5/2000 | Erimli et al. | |
| 6,104,696 A * | 8/2000 | Kadambi et al. | 370/218 |
| 6,119,196 A | 9/2000 | Muller et al. | |
| 6,128,284 A | 10/2000 | Oura et al. | |
| 6,172,990 B1 * | 1/2001 | Deb et al. | 370/474 |
| 6,175,902 B1 | 1/2001 | Runaldue et al. | |
| 6,185,185 B1 | 2/2001 | Bass et al. | |
| 6,310,874 B1 | 10/2001 | Miller et al. | |
| 6,328,480 B1 | 12/2001 | Strike | |
| 6,353,614 B1 * | 3/2002 | Borella et al. | 370/389 |
| 6,556,584 B1 * | 4/2003 | Horsley et al. | 370/465 |
| 6,557,037 B1 * | 4/2003 | Provino | 709/227 |
| 6,560,229 B1 * | 5/2003 | Kadambi et al. | 370/392 |
| 6,570,855 B1 | 5/2003 | Kung et al. | |
| 6,711,171 B1 * | 3/2004 | Dobbins et al. | 370/400 |
| 6,747,979 B1 * | 6/2004 | Banks et al. | 370/401 |
| 6,768,742 B1 | 7/2004 | Godfrey | |
| 6,775,278 B1 * | 8/2004 | Britton et al. | 370/389 |
| 6,879,588 B1 * | 4/2005 | Malalur | 370/389 |
| 2001/0012294 A1 * | 8/2001 | Kadambi et al. | 370/391 |
| 2001/0043604 A1 * | 11/2001 | Li et al. | 370/395 |
| 2001/0043614 A1 * | 11/2001 | Viswanadham et al. | 370/469 |

FOREIGN PATENT DOCUMENTS

| | | |
|---|---|---|
| EP | 0465090 A1 | 1/1992 |
| EP | 0680178 A1 | 11/1995 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 3/1998 |
| WO | WO 99/00820 | 1/1999 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO 00/03256 | 1/2000 |
| WO | WO9900936 A1 | 6/2001 |

OTHER PUBLICATIONS

"Local Area Network Switch Frame Lookup Technique for Increased Speed and Flexibility," 700 IBM Technical Disclosure Bulletin 38 Jul. 1995, No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8×8 ATM Switch Chip Set with Shared Multibuffer Architecture," Harufusa Kondoh et al., 8107 IEEE Journal of Solid-State Circuits 28 Jul. 1993, No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

* cited by examiner

SWITCH HAVING EXTERNAL ADDRESS RESOLUTION INTERFACE

CROSS-REFERENCE TO RELATED APPLICATIONS

This application is a continuation of U.S. application Ser. No. 09/885,929, filed Jun. 22, 2001, which claims priority of U.S. Provisional Patent Application Ser. No. 60/213,478 filed on Jun. 23, 2000 and U.S. Provisional Patent Application Ser. No. 60/213,482 filed on Jun. 23, 2000. The subject matter of these previously filed applications is hereby incorporated by reference.

BACKGROUND OF THE INVENTION

1. Field of the Invention

The invention relates to a method and apparatus for high performance switching in local area communications networks such as token ring, ATM, ethernet, fast ethernet, and gigabit ethernet environments, generally known as LANs. In particular, the invention relates to a new switching architecture in an integrated, modular, single chip solution, which can be implemented on a semiconductor substrate such as a silicon chip.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, and Fast Ethernet is up to 100 megabits per second. The newest ethernet is referred to as gigabit ethernet, and is capable of transmitting data over a network at a rate of up to 1,000 megabits per second. As speed has increased, design constraints and design requirements have become more and more complex with respect to following appropriate design and protocol rules and providing a low cost, commercially viable solution. For example, high speed switching requires high speed memory to provide appropriate buffering of packet data; conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed. Furthermore, external CPU involvement should be avoided, since CPU involvement also makes it almost impossible to operate the switch at linespeed. Additionally, as network switches have become more and more complicated with respect to requiring rules tables and memory control, a complex multi-chip solution is necessary which requires logic circuitry, sometimes referred to as glue logic circuitry, to enable the various chips to communicate with each other. Additionally, cost/benefit tradeoffs are necessary with respect to expensive but fast SRAMs versus inexpensive but slow DRAMs. Additionally, DRAMs, by virtue of their dynamic nature, require refreshing of the memory contents in order to prevent losses thereof. SRAMs do not suffer from the refresh requirement, and have reduced operational overhead when compared to DRAMs such as elimination of page misses, etc. Although DRAMs have adequate speed when accessing locations on the same page, speed is reduced when other pages must be accessed.

Referring to the OSI 7-layer reference model discussed previously, and illustrated in FIG. 7, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The invention is directed to a network switch that has a plurality of input ports that receive data packets. An external address resolution interface is connected to the plurality of input ports. The external address resolution interface externally transmits the data packets for processing, and receives the data packets after processing. A memory management unit is connected to the external interface and a plurality of output ports are connected to the memory management unit.

The invention is also directed to a method of processing a data packet in a network switch. The method has the steps of receiving a data packet in an input port and transmitting the data packet from the input port over an interface to an external module for address resolution. The packet is then processed in the external module and transmitted from the external module to the interface. The packet is then received in the interface from said external module and transmitted from the interface to a memory management unit. The packet is finally transmitted from the memory management unit to an output port.

Another embodiment of the invention is a network switch having an input port receiving means for receiving a data packet in an input port; an input port transmitting means for transmitting said data packet from said input port over an interface to an external module for address resolution; a processing means for processing said packet in said external module; an external module transmitting means for transmitting said packet from said external module to said interface; an interface receiving means for receiving said data packet in said interface from said external module; an interface transmitting means for transmitting said data packet from said interface to a memory management unit; and a memory unit transmitting means for transmitting said data packet from said memory management unit to an output port.

BRIEF DESCRIPTION OF THE DRAWINGS

The objects and features of the invention will be more readily understood with reference to the following description and the attached drawings, wherein.

Figure 1:
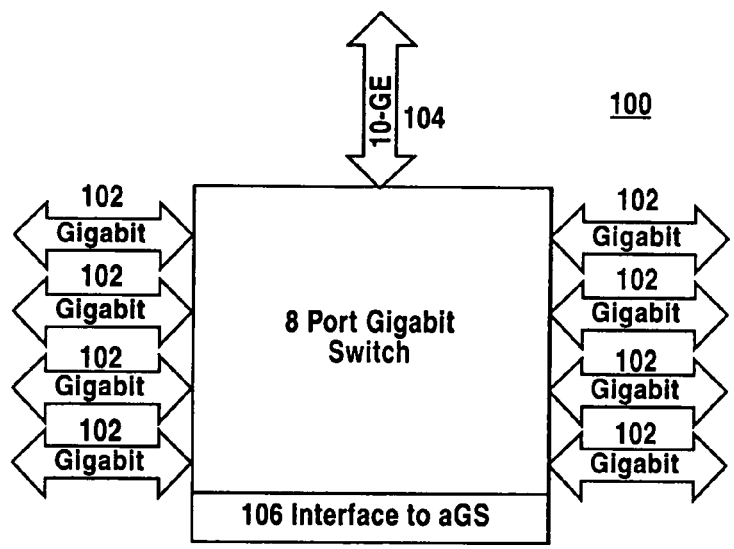
FIG. 1 is an illustration of a pGS switch of the present invention.

DETAILED DESCRIPTION OF THE PREFERRED EMBODIMENTS:

FIG. 1 is an illustration of a port gigabit switch (pGS) 100. pGS 100 has eight gigabit ports 102, a 10-GE (Gigabit Ethernet) Interface 104 and an Address Resolution Gigabit Switch (aGS) Interface 106. In an example embodiment, the aGS Interface 106 may be implemented as a high-speed serial interface or a high-speed parallel interface. For instance the aGS Interface 106 may be a content addressable memory (CAM) interface that is configured to operate in conjunction with a CAM used to implement an external address resolution unit.

pGS 100 is a Layer 2 device with on-chip Media Access Control (MAC) address tables and a Fast Filtering Processor (FFP). The device can operate in standalone mode or can be connected to other devices including other pGS devices or an external aGS to perform Layer 2, Layer 3 and FFP processing. pGS 100 is a single chip non-blocking switching solution for eight gigabit Ethernet ports and a 10-GE link. The FFP provides accelerated packet forwarding and enhanced packet flow through the use of functions such as classification, metering, shaping and re-marking.

Each gigabit port 102 of pGS 100 is associated with a corresponding MAC having an ingress for receiving data packets and an egress for transmitting data packets. Gigabit ports 102 support 10/100/1000 autonegotiation where the MACs operating at 10/100 Mbps support both half and full duplex operation and only full duplex operation at 1000 Mbps.

In one embodiment of the invention each of the gigabit ports 102 can be connected to a CPS channel. Arbitration for the CPS channel occurs out of band. The CPS channel is monitored by each of the gigabit ports 102, and matching destination ports respond to appropriate transactions. C-channel arbitration is a demand priority round robin arbitration mechanism. If no requests are active, however, the default module, which can be selected during the configuration of pGS 100 can park on the channel and have complete access thereto. If all requests are active, the configuration of pGS 100 is such that a Pipeline Memory Management Unit (PMMU) is granted access every other cell cycle, and gigabit ports 102 share equal access to the C-channel on a round robin basis. The PMMU and gigabit ports 102 alternate access, and the PMMU gains access every other cycle.

In the protocol or P-channel a plurality of messages can be placed on the P-channel in order to properly direct flow of data flowing on the C-channel. Since the P-channel can be typically 32 bits wide, and a message typically requires 128 bits, four smaller 32 bit messages are put together in order to form a complete P-channel message. The following list identifies the fields and function and the various bit counts of the 128 bit message on the P-channel.

Opcode—2 bits long—Identifies the type of message present on the C channel 81;

IP Bit—1 bit long—This bit is set to indicate that the packet is an IP switched packet;

IPX Bit—1 bit long—This bit is set to indicate that the packet is an IPX switched packet;

Next Cell—2 bits long—A series of values to identify the valid bytes in the corresponding cell on the C channel 81;

SRC DEST Port—6 bits long—Defines the port number which sends the message or receives the message, with the interpretation of the source or destination depending upon Opcode;

Cos—3 bits long—Defines class of service for the current packet being processed;

J—1 bit long—Describes whether the current packet is a jumbo packet;

S—1 bit long—Indicates whether the current cell is the first cell of the packet;

E—1 bit long—Indicates whether the current cell is the last cell of the packet;

CRC—2 bits long—Indicates whether a Cyclical Redundancy Check (CRC) value should be appended to the packet and whether a CRC value should be regenerated;

P Bit—1 bit long—Determines whether MMU should Purge the entire packet;

Len—7 bytes—Identifies the valid number of bytes in current transfer;

—2 bits—Defines an optimization for processing by the CPU 52; and

Bc/Mc Bitmap—28 bits—Defines the broadcast or multicast bitmap. Identifies egress ports to which the packet should be set, regarding multicast and broadcast messages.

Untag Bits/Source Port—28/5 bits long—Depending upon Opcode, the packet is transferred from Port to MMU, and this field is interpreted as the untagged bit map. A different Opcode selection indicates that the packet is being transferred from MMU to egress port, and the last six bits of this field is interpreted as the Source Port field. The untagged bits identifies the egress ports which will strip the tag header, and the source port bits identifies the port number upon which the packet has entered the switch;

U Bit—1 bit long—For a particular Opcode selection (0×01, this bit being set indicates that the packet should leave the port as Untagged; in this case, tag stripping is performed by the appropriate MAC;

CPU Opcode—18 bits long—These bits are set if the packet is being sent to the CPU for any reason. Opcodes are defined based upon filter match, learn bits being set, routing bits, destination lookup failure (DLF), station movement, etc;

Time Stamp—14 bits—The system puts a time stamp in this field when the packet arrives, with a granularity of 1 μsec.

The opcode field of the P-channel message defines the type of message currently being sent. While the opcode is currently shown as having a width of 2 bits, the opcode field can be widened as desired to account for new types of messages as may be defined in the future.

An early termination message is used to indicate that the current packet is to be terminated. During operation, as discussed in more detail below, the status bit (S) field in the message is set to indicate the desire to purge the current packet from memory. Also in response to the status bit all applicable egress ports would purge the current packet prior to transmission.

The Src Dest Port field of the P-channel message, as stated above, define the destination and source port addresses, respectively. Each field is 6 bits wide and therefore allows for the addressing of sixty-four ports.

The CRC field of the message is two bits wide and defines CRC actions. Bit 0 of the field provides an indication whether the associated egress port should append a CRC to the current packet. An egress port would append a CRC to the current packet when bit 0 of the CRC field is set to a logical one. Bit 1 of the CRC field provides an indication whether the associated egress port should regenerate a CRC for the current packet. An egress port would regenerate a CRC when bit 1 of the CRC field is set to a logical one. The CRC field is only valid for the last cell transmitted as defined by the E bit field of P-channel message set to a logical one.

As with the CRC field, the status bit field (st), the Len field, and the Cell Count field of the message are only valid for the last cell of a packet being transmitted as defined by the E bit field of the message.

Last, the time stamp field of the message has a resolution of 1 μs and is valid only for the first cell of the packet defined by the S bit field of the message. A cell is defined as the first cell of a received packet when the S bit field of the message is set to a logical one value.

As is described in more detail below, the C channel and the P channel are synchronously tied together such that data on C channel is transmitted over the CPS channel while a corresponding P channel message is simultaneously transmitted.

The S channel is a 32-bit wide channel which provides a separate communication path within the pGS 100. The S channel is used for management by a Central Processing Unit (CPU), pGS 100 internal flow control, and pGS 100 inter-module messaging. The S channel is a sideband channel of the CPS channel, and is electrically and physically isolated from the C channel and the P channel. It is important to note that since the S channel is separate and distinct from the C channel and the P channel, operation of the S channel can continue without performance degradation related to the C channel and P channel operation. Conversely, since the C channel is not used for the transmission of system messages, but rather only data, there is no overhead associated with the C channel and, thus, the C channel is able to free-run as needed to handle incoming and outgoing packet information.

The S channel of the CPS channel provides a system wide communication path for transmitting system messages throughout pGS 100.

The message format for an S channel message on an S channel can be formed of four 32-bit words. The bits of the fields of the words are defined as follows:

Opcode—6 bits long—Identifies the type of message present on the S channel;

Dest Port—6 bits long—Defines the port number to which the current S channel message is addressed;

Src Port—6 bits long—Defines the port number of which the current S channel message originated;

COS—3 bits long—Defines the class of service associated with the current S channel message; and C bit—1 bit long—Logically defines whether the current S channel message is intended for the CPU 52.

Error Code—2 bits long—Defines a valid error when the E bit is set;

DataLen—7 bits long—Defines the total number of data bytes in the Data field;

E bit—1 bit long—Logically indicates whether an error has occurred in the execution of the current command as defined by opcode;

Address—32 bits long—Defines the memory address associated with the current command as defined in opcode;

Data—0-127 bits long—Contains the data associated with the current opcode.

With the configuration of the CPS channel as explained above, the decoupling of the S channel from the C channel and the P channel is such that the bandwidth on the C channel can be preserved for cell transfer, and that overloading of the C channel does not affect communications on the sideband channel. An aGS interface 106 can be connected to a CPS channel.

The aGS Interface 106 can be a high speed serial interface or a parallel interface in order to transfer data as quickly as possible. aGS Interface 106 can be connected to a CPS channel at one end and on another end to an external aGS which performs Address Resolution Logic (ARL) functions on the external aGS. The bandwidth of the aGS interface can be such that it can transmit and receive packets from all ports on pGS 100. In addition when pGS 100 utilizes an external aGS using aGS Interface 102, the FFP provided on pGS 100 is not used and the FFP provided on the external aGS is utilized. The external aGS, in addition to performing ARL functions externally, can also be provided with a means for very low buffering to speed up processing. In some cases a FIFO is provided which will only result in a FIFO latency.

The FFP provided on pGS 100 in one embodiment of the invention has 16 filter masks (inclusive and exclusive) and a Rules Table having a depth of 128K. The FFP on the external aGS can have 32 filter masks and a Rules Table having a depth of 256K. From this example it is evident that one advantage of having an external aGS is that it allows for more flexibility and modularity in implementing ARL functions on an as needed basis. If the on chip filter masks are not adequate for a given task, different filter masks can be used by implementing an external aGS using aGS Interface 106.

Figure 2:
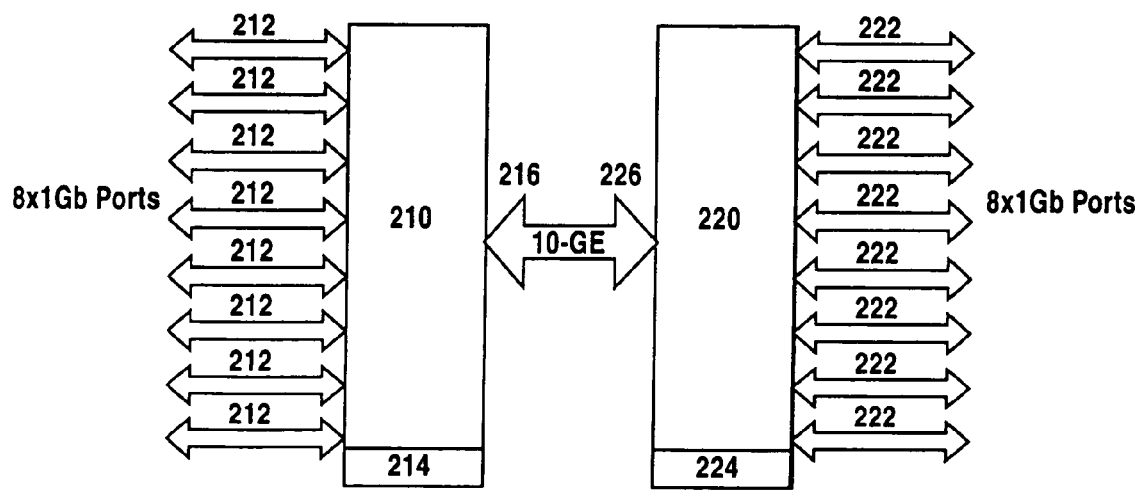
FIG. 2 is an illustration of two pGS switches being connected via 10-GE Interfaces.

FIG. 2 illustrates a first pGS 210 having eight gigabit ports 212, an aGS interface 214 and a 10-GE interface 216, and a second pGS 220 having eight gigabit ports 222, an aGS interface 224 and a 10-GE interface 226. First pGS 210 is interconnected to second pGS 220 between 10-GE interface 214 and 10-GE interface 224. In this configuration, the interconnection of two pGSs results in a 16 port non-blocking solution.

Figure 3:
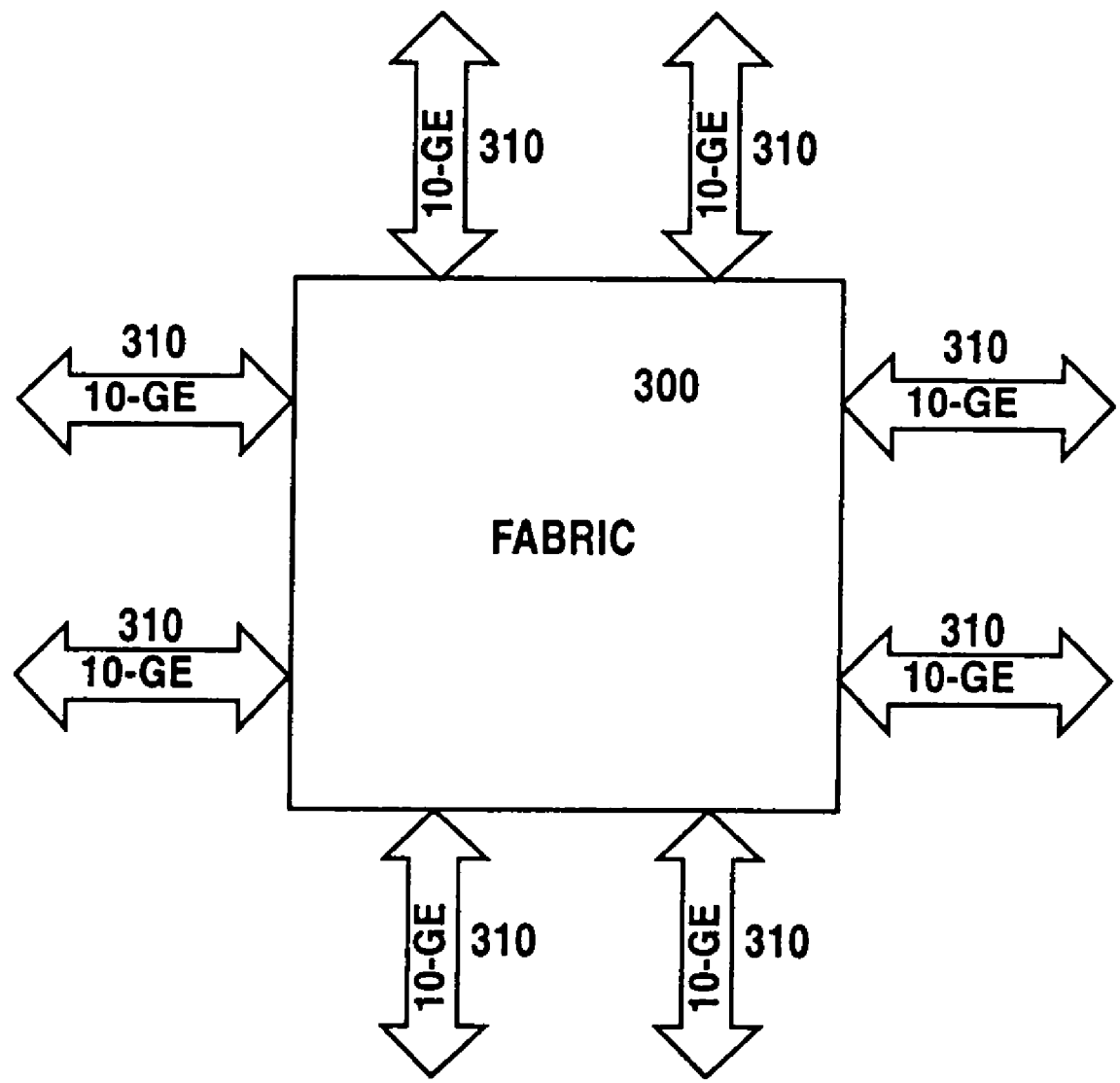
FIG. 3 is an illustration of an fGS fabric.

FIG. 3 illustrates an fGS cross-bar fabric 300 having eight 10-GE interfaces 310. An fGS can be used to interconnect multiple devices together. The fGS cross-bar fabric illustrated in FIG. 3 can be used to interconnect eight pGS switches using the eight 10-GE interfaces 310.

Figure 4:
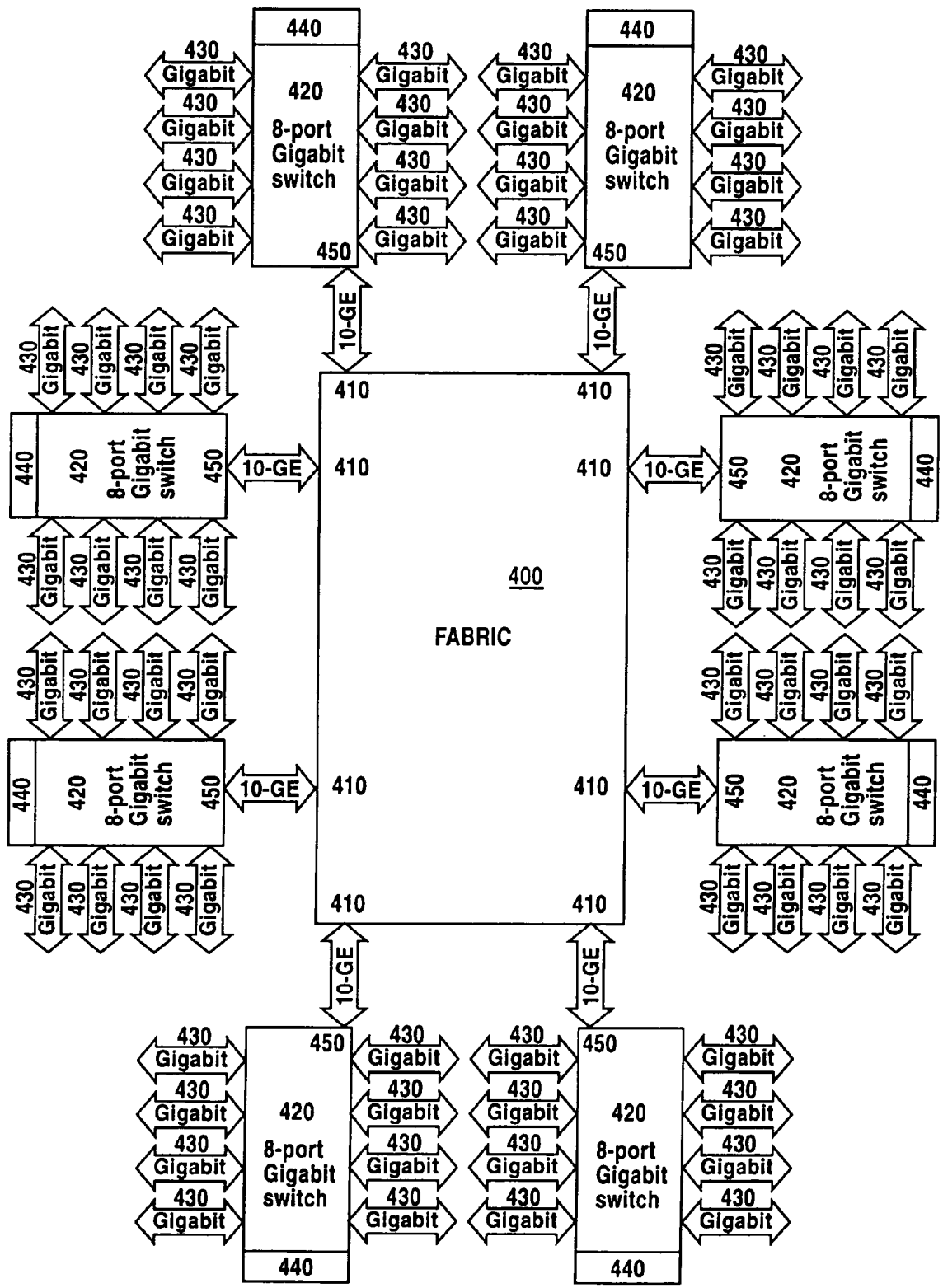
FIG. 4 is an illustration of eight pGS switches connected to one another through an fGS fabric.

FIG. 4 is an illustration of an fGS fabric 400 having eight 10-GE interfaces 410. Each of the eight pGS switches 420 each have eight gigabit ports 430, an aGS interface 440 and a 10-GE interface 450. Each of the eight pGS switches 420 are interconnected to one another through fGS fabric 400. Each of the 10-GE interfaces 450 of each of the pGS switches 420 are connected to an associated 10-GE interface 410 of fGS fabric 400. In this way the eight pGS switches 420 are interconnected through fGS fabric 400 by the 10-GE interfaces provided on each of the pGS switches 420 and the fGS fabric 400.

The aGS interfaces 440 are used to interconnect each of the pGS switches 420 to an external aGS for address resolution. However, each of the pGS switches 420 can in some embodiments of the invention perform address resolution functions without the use of an external aGS. For instance a pGS switch 420 could have an internal aGS. If pGS switch 420 does not detect an external aGS connected to aGS interface 440 (e.g., using an appropriate detection unit) the internal aGS will be used for address resolution. If pGS switch 420 does detect an external aGS connected to aGS interface 440 the external aGS will be utilized. An advantage of this feature is that it will allows for flexibility in the type of address resolution functions are performed. If the internal aGS is not desired an external aGS can be implemented providing more flexibility and modularity.

In one example of the present invention an FFP provided on pGS switch 420 has the functions of classification, metering, shaping and re-marking. In this example pGS switch 420 is provided with 16 filter masks and a 128K depth rules table. If an external aGS is connected to aGS interface 440, the internal FFP will not be utilized and the external aGS will be accessed. In this example the external aGS connected to aGS interface 440 provides 32 filter masks and a 256K rules table to pGS 420. Thus in this example, the same pGS 420 could be configured for 16 filter masks and a 128K rules table using the internal FFP or 32 filter masks and a 256K rules table using an external aGS through aGS interface 106 providing flexibility and modularity to pGS 420.

Figure 5:
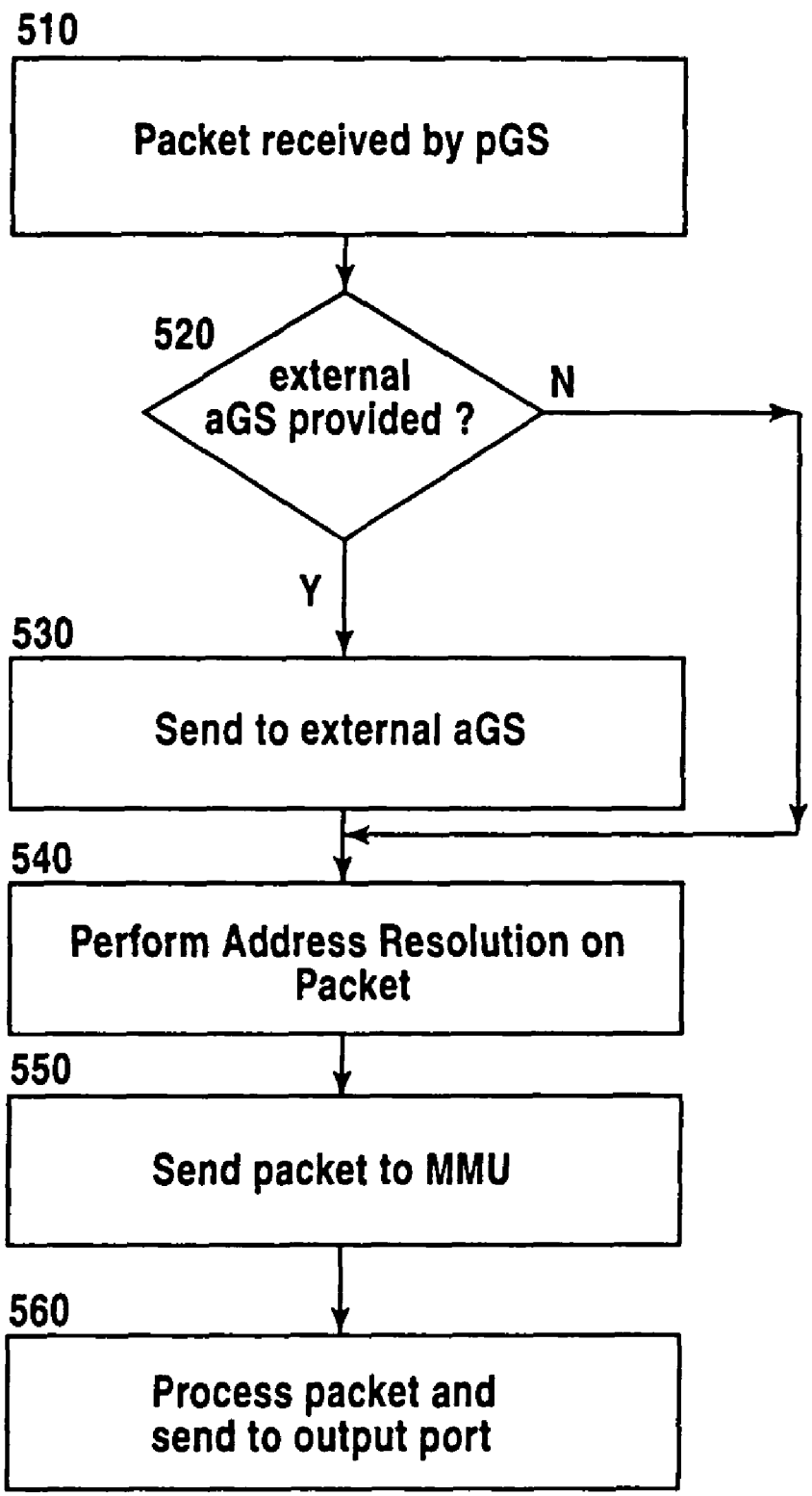
FIG. 5 is a flow diagram of how a packet is transferred through a pGS of the present inventon.

FIG. 5 is a flow diagram illustrating the flow of a packet received by a pGS. FIG. 5 is described in relation with FIG. 1. In step 510 a packet is received by pGS 100 through one of the gigabit ports 102. In one example of the invention, gigabit port 102 will have an ingress MAC for receiving the packet. In step 520 the packet will be processed by the ingress of the MAC and it will be determined if an external aGS is connected to aGS interface 106.

If an external aGS is detected, the packet is transmitted to aGS interface 106 in step 530. If an external aGS is not detected, the packet is processed using the internally provided aGS for address resolution. However, in some cases pGS 100 is not provided with an internal aGS for address resolution. In these cases step 520 is skipped and the packet is sent directly to aGS interface 106 as shown in step 530. When the packet is received by aGS interface 106 the packet is transmitted to the external aGS using a high speed serial interface or a parallel interface in order to transmit the packet externally as fast as possible so that minimal or no delay is experienced.

In step 540 the packet is received by the proper aGS and address resolution is performed on the packet. In some cases the address is learned and processed in order to transmit the packet to the proper port for output quickly and efficiently. In other cases the address is already learned and the packet can be transmitted directly to the proper output port. A variety of other address resolution functions can be performed by the aGS in order to help process and transmit the packet more efficiently and quickly. After the packet has been processed by the aGS, the packet is forwarded through pGS 100 for further processing. For example, in step 550 the packet can be sent to an MMU for further processing and finally be transmitted to the proper output gigabit port 102 as shown in step 560. If the packet is being sent from an external aGS through aGS interface 106, the packet is sent to the MMU across a high speed serial interface or a parallel interface in order to transmit the packet externally as fast as possible so that minimal or no delay is experienced. If the packet is being transmitted internally a CPS bus can be used for transmission.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A network switch comprising:
an internal address resolution unit configured to perform address resolution; and
a detection unit configured to detect if an external address resolution unit is coupled to the network switch,
wherein:
if the external address resolution unit is not detected by the detection unit, the network switch is further configured to utilize the internal address resolution unit to perform address resolution; and
if the external address resolution unit is detected by the detection unit; the network switch is further configured to:
transmit a received data packet to the external address resolution unit; and
receive, after processing by the external address resolution unit, the processed data packet from the external address resolution unit.

2. The network switch of claim 1, further comprising:
a plurality of input ports;
an external address resolution interface operatively coupled with the plurality of input ports,
wherein:
the external address resolution interface is configured to operatively couple the network switch with the external address resolution unit.

3. The network switch of claim 1, wherein the internal address resolution unit comprises a fast filtering processor.

4. The network switch of claim 2, wherein the external address resolution interface comprises an address resolution gigabit interface.

5. The network switch of claim 2, wherein the external address resolution interface comprises a high speed external interface.

6. The network switch of claim 2, wherein the external address resolution unit is configured to perform an address resolution logic function.

7. The network switch of claim 2, wherein the external address resolution unit includes a buffering unit.

8. The network switch of claim 2, wherein the external address resolution interface comprises a content addressable memory interface.

9. A method of processing a data packet in a network switch comprising:
receiving a data packet at an input port of the network switch;
determining, by the network switch, whether a connection between the network switch and an external address resolution unit is present;
performing, by the network switch, an address resolution function in absence of the external address resolution unit; and
in the event the connection between the network switch and the external address resolution unit is present:
transmitting, by the network switch via an interface of the network switch, the data packet to the external address resolution unit; and
receiving, after processing by the external address resolution unit, the data packet at the interface from the external address resolution unit.

10. A network switch comprising:
internal address resolution means for performing address resolution; and
detection means for detecting if an external address resolution unit is coupled to the network switch,
wherein:
if the external address resolution unit is not detected by the detection means, the network switch is further configured to utilize the internal address resolution means to perform address resolution; and
if the external address resolution unit is detected by the detection means; the network switch is further configured to:
transmit a received data packet to the external address resolution unit; and
receive, after processing by the external address resolution unit, the processed data packet from the external address resolution unit.

11. The network switch of claim 10, wherein the external address resolution means is configured to perform an address resolution logic function.

12. The network switch of claim 10, wherein the external address resolution means further includes buffering means.

13. The network switch of claim 10, wherein the detection means comprises a content addressable memory interface.

* * * * *